(12) United States Patent
Sears et al.

(10) Patent No.: US 11,682,178 B2
(45) Date of Patent: Jun. 20, 2023

(54) ALTERNATING PERCEIVED REALITIES IN A VIRTUAL WORLD BASED ON FIRST PERSON PREFERENCES AND A RELATIVE COORDINATE SYSTEM

(71) Applicant: Meta Platforms Technologies, LLC, Menlo Park, CA (US)

(72) Inventors: Jasmine Soria Sears, Kirkland, WA (US); Geeti Arora, San Ramon, CA (US); Allison Fu, Palo Alto, CA (US); Tiffany Madruga, Santa Clara, CA (US); Rachel Cross, Foster City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 24 days.

(21) Appl. No.: 17/528,105

(22) Filed: Nov. 16, 2021

(65) Prior Publication Data
US 2023/0154114 A1    May 18, 2023

(51) Int. Cl.
| | |
|---|---|
| *G06T 19/00* | (2011.01) |
| *G06N 20/00* | (2019.01) |
| *G06T 13/40* | (2011.01) |
| *G06V 20/20* | (2022.01) |
| *H04L 67/131* | (2022.01) |

(52) U.S. Cl.
CPC .......... *G06T 19/006* (2013.01); *G06N 20/00* (2019.01); *G06T 13/40* (2013.01); *G06V 20/20* (2022.01); *H04L 67/131* (2022.05)

(58) Field of Classification Search
None
See application file for complete search history.

(56) References Cited

U.S. PATENT DOCUMENTS

| | | | |
|---|---|---|---|
| 2017/0295446 A1* | 10/2017 | Thagadur Shivappa | ................... H04S 7/304 |
| 2019/0265945 A1 | 8/2019 | Newell et al. | |
| 2020/0066046 A1* | 2/2020 | Stahl | ..................... G06T 19/006 |
| 2020/0394933 A1* | 12/2020 | Nagar | .................. G06V 40/174 |

(Continued)

OTHER PUBLICATIONS

EPO—International Search Report and Written Opinion for International Application No. PCT/IB2022/061108, dated Feb. 8, 2023, 9 pages.

*Primary Examiner* — Tapas Mazumder
(74) *Attorney, Agent, or Firm* — McDermott Will & Emery LLP

(57) ABSTRACT

Various aspects of the subject technology relate to systems, methods, and machine-readable media for changing perception of artificial reality content in a shared artificial reality environment. Various aspects may include determining user perception preferences associated with a user representation in the environment. Aspects may also include generating coordinates of a coordinate system and determining a distance between coordinates. Aspects may also include changing a perception parameter corresponding to the user representation based on the determined distances. Aspects may also include determining a visual style of the user representation based on an associated selected artificial reality application. Aspects may include providing instructions to display a virtual area including the user representation according to determined visual style and changed perception parameter.

20 Claims, 9 Drawing Sheets

(56) References Cited

U.S. PATENT DOCUMENTS

2021/0240978 A1\* 8/2021 Steeves ............ G06V 30/19173
2021/0312684 A1 10/2021 Zimmermann et al.

\* cited by examiner

ALTERNATING PERCEIVED REALITIES IN A VIRTUAL WORLD BASED ON FIRST PERSON PREFERENCES AND A RELATIVE COORDINATE SYSTEM

TECHNICAL FIELD

The present disclosure generally relates to changing user perception of artificial reality content for computer generated shared artificial reality environments.

BACKGROUND

Interaction between a computer generated shared artificial reality environment involves interaction with various types of artificial reality content, elements, and/or applications in the shared artificial reality environment. Users of the shared artificial reality environment may desire to customize their perception of virtual aspects of the shared artificial reality environment. Options to create alternative versions of the shared artificial reality may enhance the user experience with respect to personalized interaction in the shared artificial reality environment.

BRIEF SUMMARY

The subject disclosure provides for systems and methods for generating alternative perceived realities in an artificial reality environment such as a shared virtual reality environment. Alternating between different alternative perceived realities can be based on user preferences and/or selected artificial reality applications. The user preferences can specify perception preferences related to how user representations appear in virtual areas or spaces of the shared virtual reality environment. The selected artificial reality applications may be used to determine associated stylistic or aesthetic aspects so that the attire and/or appearance of user representations can be styled according to the selected artificial reality applications. Accordingly, users of the shared virtual reality environment can advantageously experience personalized artificial realities, which can enhance their enjoyment of the shared virtual reality environment.

According to one embodiment of the present disclosure, a computer-implemented method for changing perception of artificial reality content in a shared artificial reality environment is provided. The method includes determining user perception preferences associated with a user representation in the shared artificial reality environment. The method also includes generating a first coordinate of a coordinate system. The first coordinate corresponds to a location of the user representation in the shared artificial reality environment. The method also includes determining a distance or angle from the first coordinate to a second coordinate of the coordinate system. The second coordinate corresponds to an artificial reality element in the shared artificial reality environment. The method also includes changing a perception parameter of the artificial reality element based on the distance. The method also includes determining a visual style of the user representation based on an associated artificial reality application. The method includes providing instructions to display a virtual area including the user representation in the shared artificial reality environment according to the visual style of the user representation and based on changing the perception parameter.

According to one embodiment of the present disclosure, a system is provided including a processor and a memory comprising instructions stored thereon, which when executed by the processor, causes the processor to perform a method for changing perception of artificial reality content in a shared artificial reality environment. The method includes determining user perception preferences associated with a user representation in the shared artificial reality environment. The method may include applying a machine learning algorithm to determine settings of a coordinate system based on the user perception preferences. The method also includes generating a first coordinate of the coordinate system. The first coordinate corresponds to a location of the user representation in the shared artificial reality environment. The method also includes determining a distance or angle from the first coordinate to a second coordinate of the coordinate system. The second coordinate corresponds to an artificial reality element in the shared artificial reality environment. The method also includes changing a perception parameter of the artificial reality element based on the distance. The method also includes determining a visual style of the user representation based on an associated artificial reality application. The method includes providing instructions to display a virtual area including the user representation in the shared artificial reality environment according to the visual style of the user representation and based on changing the perception parameter.

According to one embodiment of the present disclosure, a non-transitory computer-readable storage medium is provided including instructions (e.g., stored sequences of instructions) that, when executed by a processor, cause the processor to perform a method for changing perception of artificial reality content in a shared artificial reality environment. The method may include receiving a user input indicative of user perception preferences. The method includes determining the user perception preferences associated with a user representation in the shared artificial reality environment. The method may include applying a machine learning algorithm to determine settings of a coordinate system based on the user perception preferences. The method also includes generating a first coordinate of a coordinate system. The first coordinate corresponds to a location of the user representation in the shared artificial reality environment. The method also includes determining a distance or angle from the first coordinate to a second coordinate of the coordinate system. The second coordinate corresponds to an artificial reality element in the shared artificial reality environment. The method also includes changing a perception parameter of the artificial reality element based on the distance. The method also includes determining a visual style of the user representation based on an associated artificial reality application. The method includes providing instructions to display a virtual area including the user representation in the shared artificial reality environment according to the visual style of the user representation and based on changing the perception parameter.

According to one embodiment of the present disclosure, a system is provided that includes means for storing instructions, and means for executing the stored instructions that, when executed by the means, cause the means to perform a method for changing perception of artificial reality content in a shared artificial reality environment. The method may include receiving a user input indicative of user perception preferences. The method includes determining the user perception preferences associated with a user representation in the shared artificial reality environment. The method may include applying a machine learning algorithm to determine settings of a coordinate system based on the user perception preferences. The method also includes generating a first coordinate of a coordinate system. The first coordinate corresponds to a location of the user representation in the shared artificial reality environment. The method also includes determining a distance or angle from the first coordinate to a second coordinate of the coordinate system. The second coordinate corresponds to an artificial reality element in the shared artificial reality environment. The method also includes changing a perception parameter of the artificial reality element based on the distance. The method also includes determining a visual style of the user representation based on an associated artificial reality application. The method includes providing instructions to display a virtual area including the user representation in the shared artificial reality environment according to the visual style of the user representation and based on changing the perception parameter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
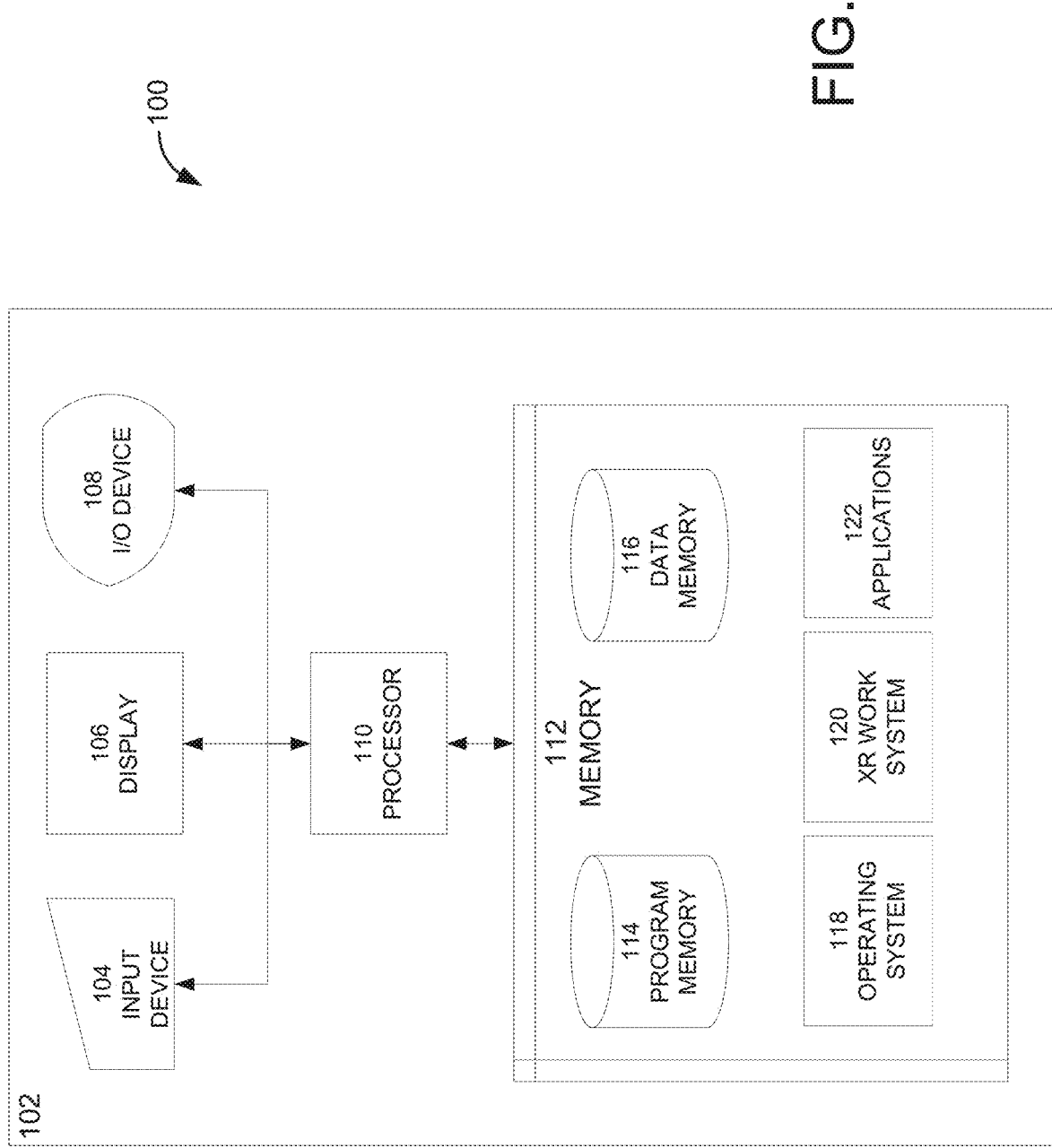
FIG. 1 is a block diagram of a device operating environment with which aspects of the subject technology can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The disclosed system addresses a problem in artificial reality tied to computer technology, namely, the technical problem of maintaining and changing between separate versions of artificial reality within a computer generated shared artificial reality environment. The disclosed system solves this technical problem by providing a solution also rooted in computer technology, namely, by separately rendering personal versions of artificial reality for separate users based on the shared artificial reality environment. The disclosed system also improves the functioning of the computer itself because it enables the computer to improve intra computer communications for the practical application of a system of computers generating and hosting the shared artificial reality environment. In particular, the disclosed system provides customized artificial reality elements that improve usage of customized artificial reality by users of the computer generated shared artificial reality environment.

Aspects of the present disclosure are directed to creating and administering artificial reality environments. For example, an artificial reality environment may be a shared artificial reality environment, a virtual reality (VR), an augmented reality environment, a mixed reality environment, a hybrid reality environment, a non immersive environment, a semi immersive environment, a fully immersive environment, and/or the like. The artificial environments may also include artificial collaborative working environments which include modes for interaction between various people or users in the artificial environments. The artificial environments of the present disclosure may provide elements that enable users to feel connected with other users. For example, audio and visual elements may be provided that maintain connections between various users that are engaged in the artificial environments. As used herein, "real-world" objects are non-computer generated and artificial or VR objects are computer generated. For example, a real-world space is a physical space occupying a location outside a computer and a real-world object is a physical object having physical properties outside a computer. For example, an artificial or VR object may be rendered and part of a computer generated artificial environment.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some implementations, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. AR also refers to systems where light entering a user's eye is partially generated by a computing system and partially composes light reflected off objects in the real-world. For example, an AR headset could be shaped as a pair of glasses with a pass-through display, which allows light from the real-world to pass through a waveguide that simultaneously emits light from a projector in the AR headset, allowing the AR headset to present virtual objects intermixed with the real objects the user can see. The AR headset may be a block-light headset with video pass-through. "Artificial reality," "extra reality," or "XR," as used herein, refers to any of VR, AR, MR, or any combination or hybrid thereof.

Several implementations are discussed below in more detail in reference to the figures. FIG. 1 is a block diagram of a device operating environment 100 with which aspects of the subject technology can be implemented. The device operating environment can comprise hardware components of a computing system 100 that can create, administer, and provide interaction modes for a shared artificial reality environment (e.g., collaborative artificial reality environment). The interaction modes can include modes for personalized artificial realities, such as personal coordinate systems, personal perception details, personal user representation appearance, and/or the like for each user of the computing system 100. In various implementations, the computing system 100 can include a single computing device or multiple computing devices 102 that communicate over wired or wireless channels to distribute processing and share input data.

In some implementations, the computing system 100 can include a stand-alone headset capable of providing a computer created or augmented experience for a user without the need for external processing or sensors. In other implementations, the computing system 100 can include multiple computing devices 102 such as a headset and a core processing component (such as a console, mobile device, or server system) where some processing operations are performed on the headset and others are offloaded to the core processing component. Example headsets are described below in relation to FIGS. 2A-2B. In some implementations, position and environment data can be gathered only by sensors incorporated in the headset device, while in other implementations one or more of the non-headset computing devices 102 can include sensor components that can track environment or position data. For example, the sensors may include inertial measurement units (IMUs), eye tracking sensors, and/or the like to determine the environment and position data. The position data can include tracking the eye movement and/or head tilt of various users corresponding to user representations immersed in the rendered shared artificial reality environment.

The computing system 100 can include one or more processor(s) 110 (e.g., central processing units (CPUs), graphical processing units (GPUs), holographic processing units (HPUs), etc.) The processors 110 can be a single processing unit or multiple processing units in a device or distributed across multiple devices (e.g., distributed across two or more of computing device 102s). The computing system 100 can include one or more input devices 104 that provide input to the processors 110, notifying them of actions. The actions can be mediated by a hardware controller that interprets the signals received from the input device and communicates the information to the processors 110 using a communication protocol. Each input device 104 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, and/or other user input devices.

The processors 110 can be coupled to other hardware devices, for example, with the use of an internal or external bus, such as a PCI bus, SCSI bus, wireless connection, and/or the like. The processors 110 can communicate with a hardware controller for devices, such as for a display 106. The display 106 can be used to display text and graphics. In some implementations, the display 106 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and/or the like. Other I/O devices 108 can also be coupled to the processor, such as a network chip or card, video chip or card, audio chip or card, USB, firewire or other external device, camera, printer, speakers, CD-ROM drive, DVD drive, disk drive, etc.

The computing system 100 can include a communication device capable of communicating wirelessly or wire-based with other local computing devices 102 or a network node. The communication device can communicate with another device or a server through a network using, for example, TCP/IP protocols. The computing system 100 can utilize the communication device to distribute operations across multiple network devices. For example, the communication device can function as a communication module.

The processors 110 can have access to a memory 112, which can be contained on one of the computing devices 102 of computing system 100 or can be distributed across one of the multiple computing devices 102 of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 112 can include program memory 114 that stores programs and software, such as an operating system 118, XR work system 120, and other application programs 122. The memory 112 can also include data memory 116 that can include information to be provided to the program memory 114 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and/or the like.

Figure 2B:
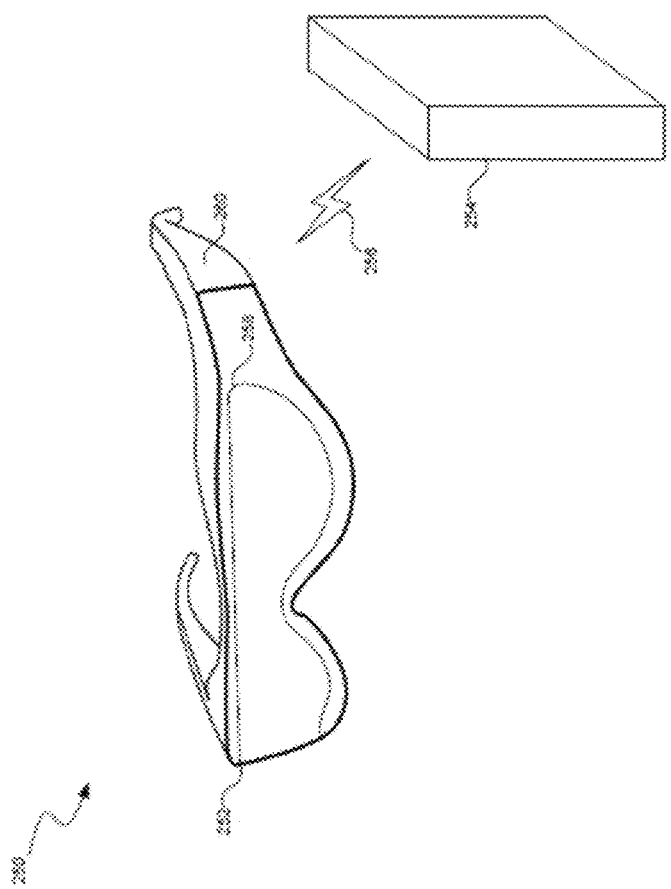
FIGS. 2A-2B are diagrams illustrating virtual reality headsets, according to certain aspects of the present disclosure.
Figure 2A:
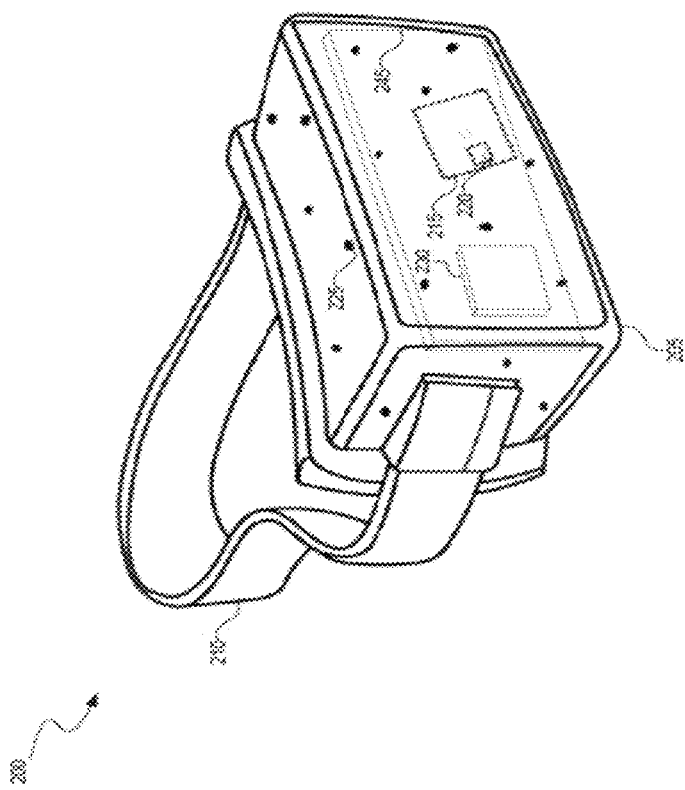

FIGS. 2A-2B are diagrams illustrating virtual reality headsets, according to certain aspects of the present disclosure. FIG. 2A is a diagram of a virtual reality head-mounted display (HMD) 200. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3DoF), six degrees of freedom (6DoF), etc. For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

FIG. 2B is a diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects. For example, the HMD system 250 can track relative position of various important features of the user or between users, such as eyes and hands. As an example, the HMD system 250 may include a relational coordinate system to track the relative positions of the eyes and hands for one or more user representations and include personal coordinate systems for personalizing remaining portions of an artificial reality environment for each user. In this way, the HMD system 250 can maintain (or purposefully avoid) eye contact between user representations across all coordinate systems. That is, the personal coordinate system may implement user specific perception preferences while maintaining the same relative positions of the various important features.

Figure 2C:
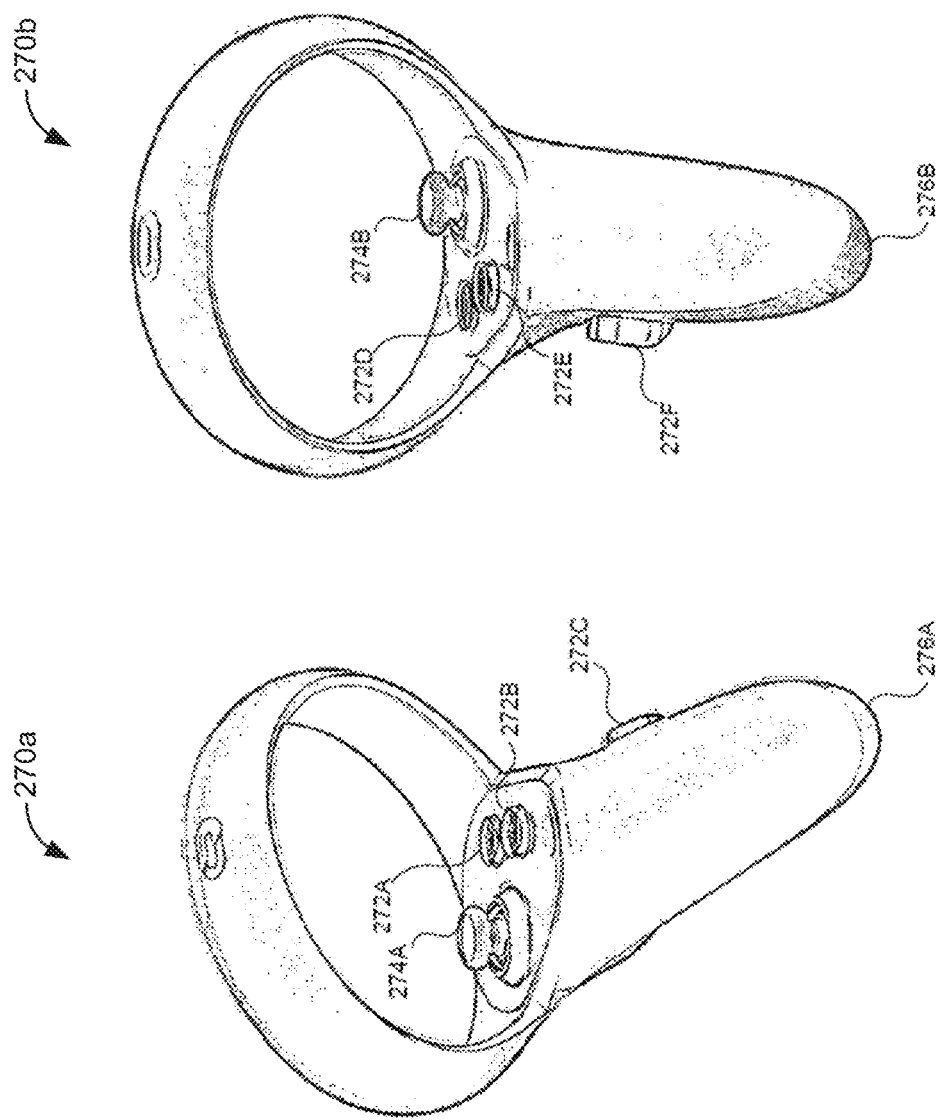
FIG. 2C illustrates controllers for interaction with an artificial reality environment.

FIG. 2C illustrates controllers 270a-270b, which, in some implementations, a user can hold in one or both hands to interact with an artificial reality environment presented by the HMD 200 and/or HMD 250. The controllers 270a-270b can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. For example, the compute units 230 can use the monitored hand positions to maintain a corresponding relative position of user representation features. As an example, the compute units 230 can maintain a coordinate distance of coordinate in a relational coordinate system having coordinate determined via the IMU units so that the maintained coordinated distance keeps the same relative position of user representation features (e.g., eyes, hands, feet, etc.).

The compute units 230 may, via the IMU outputs, compute coordinates of a separate personal coordinate system so that coordinate positions can be configured or changed based on user preferences. For example, the user preferences may specify that the user desires to be the tallest user representation in a virtual area of the artificial reality environment. In this situation, coordinates of the separate personal coordinate system can be determined on the user preferences so that the user perceives the artificial reality environment as a taller person from a higher or the highest vantage point in the virtual area. The coordinates may be determined from the user preferences based on a machine learning algorithm to determine corresponding coordinate system settings. Accordingly, when the user's user representation perceives artificial content and/or another user representation, the user may experience the sensation of looking down to perceive the content or other user representations.

As an example, the personal coordinate system coordinates can be used to scale for eye contact, such as scaling the user's visual perception in a manner that corresponds to a real-life tall person talking to a shorter person or a shorter person high fiving a taller person. The interaction or high fiving can be implemented via the personal coordinate system by adjusting the interaction or high fiving according to the respective heights of the shorter person and the taller person. In particular, the IMU units and/or position sensors can output coordinates that correspond to eye tracking and/or tilt that models eyes of the tall person looking down at the shorter person. The compute units 230 can calculate eye-to-eye distances (e.g., angles for eye-to-eye measurements, vectors, etc.) between two or more separate user representations so that the user's user representation can visually perceive artificial reality content and other use representations in a way that accords with how the user desires their user representation to appear in the artificial reality environment. The eye-to-eye distances can be measured depending on the difference between the user's user representation and another user representation in the user's artificial reality. It should be noted that different users may specify their own artificial realities based on individual user preferences. That is, each user could be the tallest person in their own version of a shared artificial reality environment. The compute units 230 can also calculate eye-to-eye distance of one particular user representation so that the appearance and relative position of features of the particular user representation is fixed according to user preferences and relative position settings corresponding to the relational coordinate system.

The customized artificial reality settings (e.g., relative position settings) can be used to set or change the appearance, style, and/or attire of the particular user representation according to a selected artificial reality application, such as based on the attire or likeliness of characters of a video game. The controllers 270a-270b can also include various buttons (e.g., buttons 272A-F) and/or joysticks (e.g., joysticks 274A-B), which a user can actuate to provide input and interact with objects. As discussed below, controllers 270a-270b can also have tips 276A and 276B, which, when in scribe controller mode, can be used as the tip of a writing implement in the artificial reality environment. In various implementations, the HMD 200 or 250 can also include additional subsystems, such as an eye tracking unit, an audio system, various network components, etc. to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

The eye tracking unit may be used to calculate vectors (e.g., distances and/or angles) to artificial reality content that should be adjusted based on user preferences. As an example, once the distances and angles to the eyes of another user representation are calculated, the another user representation's eyes may be masked, distorted, or otherwise moved so that the user does not experience the sensation of looking into the another user representation's eyes or being stared at by other users. In this way, the user can avoid any uncomfortable sensation of being looked at by others. Looking directly into the another user representation's eyes could be disfavored or not preferred by the user because the user has social anxiety, medication condition, etc. that causes the user to be uncomfortable looking at others in the eye during talking, for example. As an example, once the distances to artificial reality content are determined, the perception detail of the artificial reality content can be changed such as by reducing a level of detail, turning off an animation effect, etc. such as if the user would be bothered or distracted by the excessive visual effects of the artificial reality content.

Figure 3:
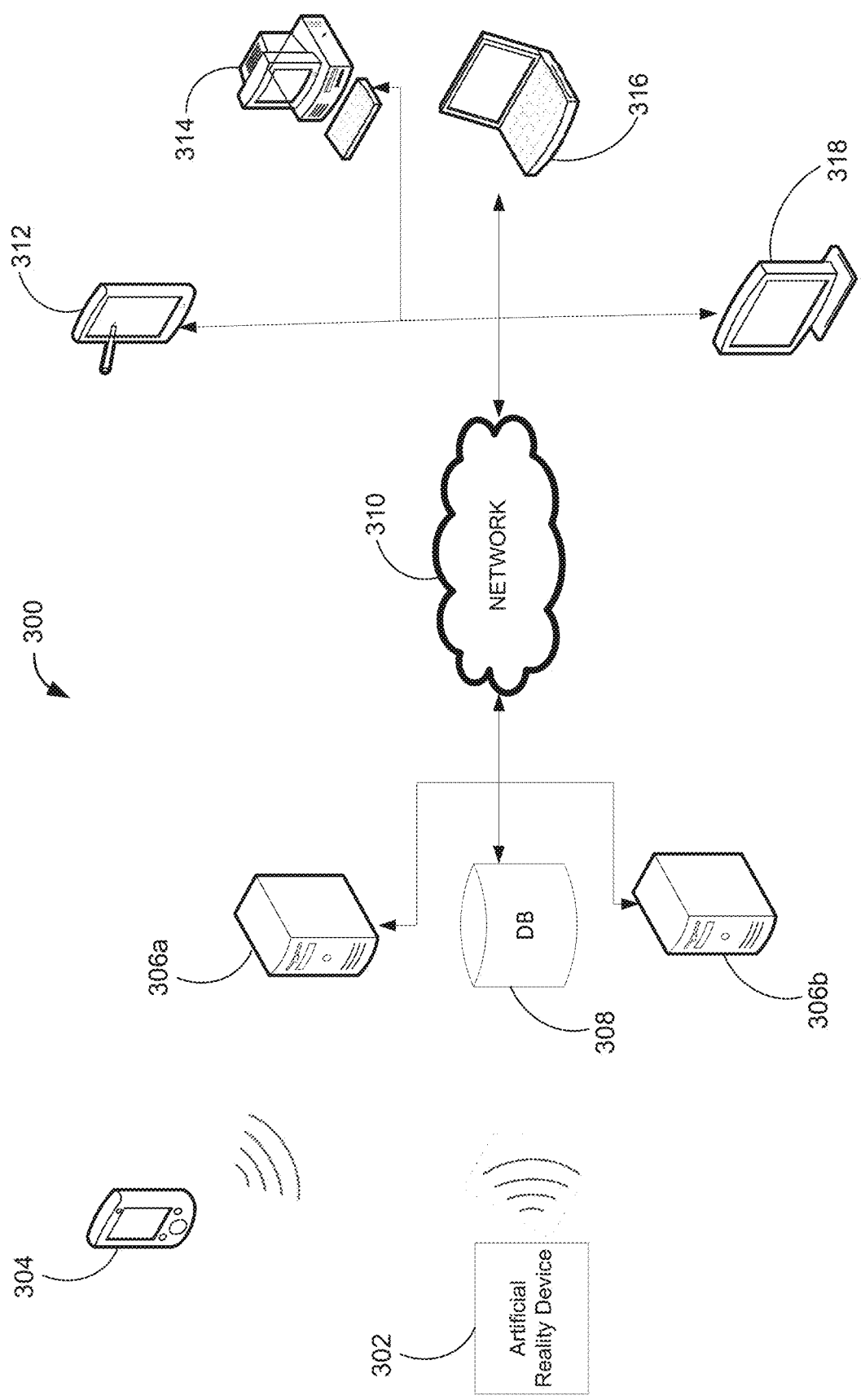
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices, such as artificial reality device 302, mobile device 304 tablet 312, personal computer 314, laptop 316, desktop 318, and/or the like. The artificial reality device 302 may be the HMD 200, HMD system 250, or some device that is compatible with rendering or interacting with an artificial reality or virtual reality environment. The artificial reality device 302 and mobile device 304 may communicate wirelessly via the network 310. In some implementations, some of the client computing devices can be the HMD 200 or the HMD system 250. The client computing devices can operate in a networked environment using logical connections through network 310 to one or more remote computers, such as a server computing device.

In some implementations, the environment 300 may include a server such as an edge server which receives client requests and coordinates fulfillment of those requests through other servers. The server may include server computing devices 306a-306b, which may logically form a single server. Alternatively, the server computing devices 306a-306b may each be a distributed computing environment encompassing multiple computing devices located at the same or at geographically disparate physical locations.

The client computing devices and server computing devices 306a-306b can each act as a server or client to other server/client device(s). The server computing devices 306a-306b can connect to a database 308. Each server computing devices 306a-306b can correspond to a group of servers, and each of these servers can share a database or can have their own database. The database 308 may logically form a single unit or may be part of a distributed computing environment encompassing multiple computing devices that are located within their corresponding server, or located at the same or at geographically disparate physical locations.

The network 310 can be a local area network (LAN), a wide area network (WAN), a mesh network, a hybrid network, or other wired or wireless networks. The network 310 may be the Internet or some other public or private network. Client computing devices can be connected to network 310 through a network interface, such as by wired or wireless communication. The connections can be any kind of local, wide area, wired, or wireless network, including the network 310 or a separate public or private network.

In some implementations, the server computing devices 306a-306b can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is familiar with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their avatar or true-to-life representation) with objects or other avatars in a virtual environment (e.g., in an artificial reality working environment), etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment where users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
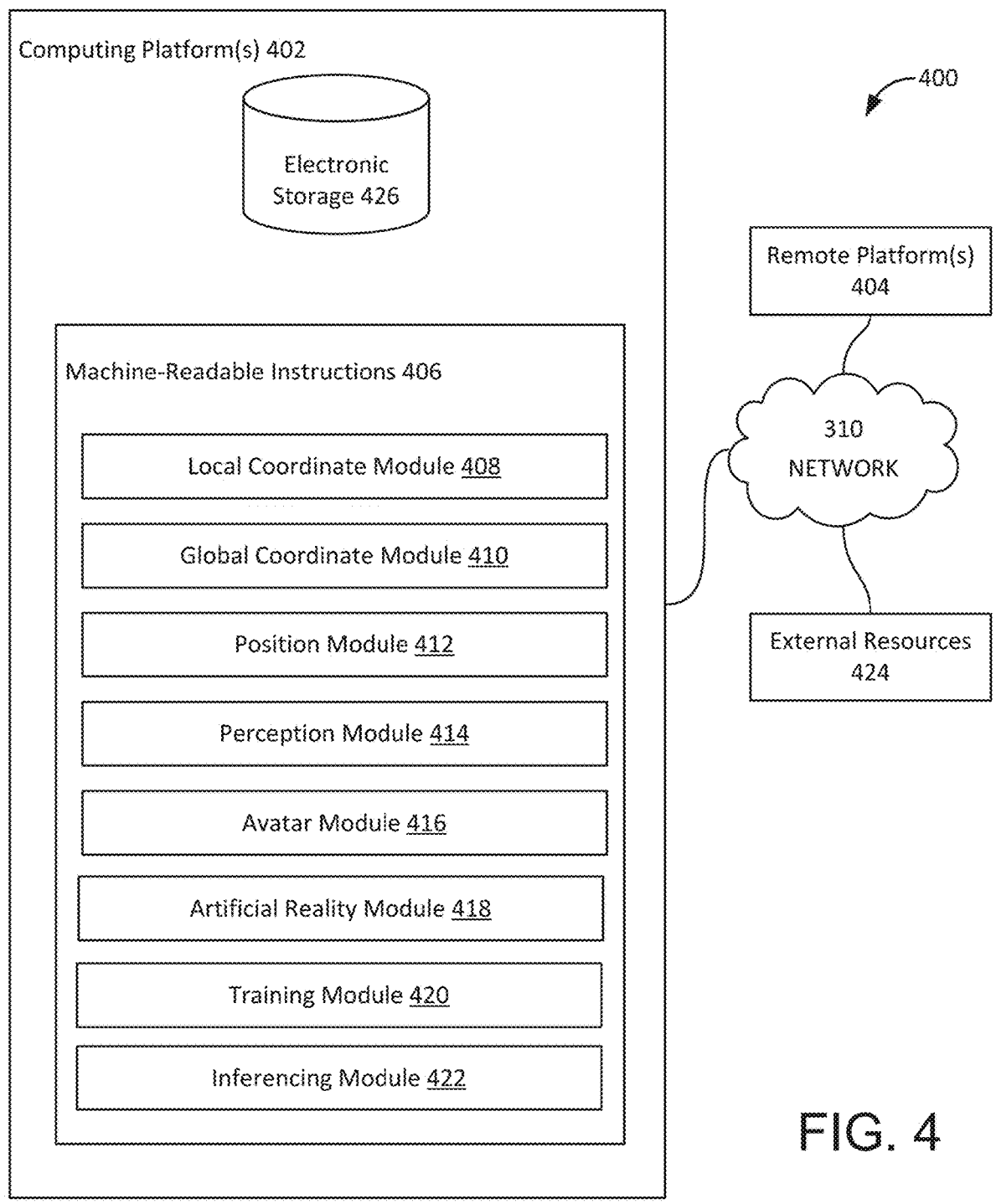
FIG. 4 is a block diagram illustrating an example computer system (e.g., representing both client and server) with which aspects of the subject technology can be implemented.

FIG. 4 is a block diagram illustrating an example computer system 400 (e.g., representing both client and server) with which aspects of the subject technology can be implemented. The system 400 may be configured for changing perception of artificial reality content in a shared artificial reality environment, according to certain aspects of the disclosure. In some implementations, the system 400 may include one or more computing platforms 402. The computing platform(s) 402 can correspond to a server component of an artificial reality platform, which can be similar to or the same as the server computing devices 306a-306b of FIG. 3 and include the processor 110 of FIG. 1. The computing platform(s) 402 can be configured to store, receive, determine, and/or analyze user preferences and/or user information to improve user experience of the shared artificial reality environment. For example, the computing platform(s) 402 may be configured to execute algorithm(s) (e.g., machine learning algorithms) to generate a personal version of the shared artificial reality environment. As an example, the personal artificial reality can be independent of real world constraints such that a shorter person in real life can feel like and appear as a taller person in the personal artificial reality.

Moreover, the personal artificial reality can include personalized adjustments to perception detail and user representation detail so that each user can experience their personal artificial reality based on their sensory preferences and consumption of artificial reality applications (e.g., selected artificial reality games previously played by users). As an example, the sensory preferences can be used to reduce a level of sensory detail in the personal artificial reality. As an example, the consumption of artificial reality applications can be used to tailor the appearance of a corresponding user representation based on the style, theme, and/or likeliness of the selected XR application. The computing platform(s) 402 can separately maintain an individual version of the shared artificial reality environment for each user, such as in the electronic storage 426, so that personal artificial reality of one user does not affect the different personal artificial reality of another user.

The computing platform(s) 402 may be configured to communicate with one or more remote platforms 404 according to a client/server architecture, a peer-to-peer architecture, and/or other architectures. The remote platform(s) 404 may be configured to communicate with other remote platforms via computing platform(s) 402 and/ or according to a client/server architecture, a peer-to-peer architecture, and/or other architectures. Users may access the system 400 hosting the shared artificial reality environment and/or personal artificial reality via remote platform(s) 404. In this way, the remote platform(s) 404 can be configured to cause output of a personalized version of the shared artificial reality environment on client device(s) of the remote platform(s) 404, such as via the HMD 200, HMD system 250, and/or controllers 270a-270b of FIG. 2C. As an example, the remote platform(s) 404 can access artificial reality content and/or artificial reality applications for use in the shared artificial reality for the corresponding user(s) of the remote platform(s) 404, such as via the external resources 424. The computing platform(s) 402, external resources 424, and remote platform(s) 404 may be in communication and/or mutually accessible via the network 150.

The computing platform(s) 402 may be configured by machine-readable instructions 406. The machine-readable instructions 406 may include one or more instruction modules. The instruction modules may include computer program modules. The instruction modules may include one or more of local coordinate module 408, global coordinate module 410, position module 412, perception module 414, avatar module 416, artificial reality module 418, training module 420, inferencing module 422, and/or other instruction modules.

The local coordinate module 408 can be configured to implement a local coordinate system in the remote platform(s) 404, such as for each XR compatible device of the remote platforms(s) 404. The local coordinate system can be a personal coordinate system for setting up the personal artificial realities according to each user's preferences. A machine learning algorithm can be used to output the settings of the personal coordinate system based on input user preferences. The local coordinate module 408 may generate coordinates for maintaining positional or coordinate details for a particular user representation and XR elements. The coordinates can be generated based on IMU units and/or position sensors of the XR compatible devices. The IMU unit can include an accelerometer, gyroscope, and/or the like to output coordinates via two dimensional or three dimensional XR pose estimation. The IMU units and/or position sensors can output a head tilt measurement of the XR compatible devices.

The XR pose estimate outputs X, Y, and/or Z coordinates usable by the local coordinate module 408. Local coordinates can also be generated based on an optical tracking component of the position sensors. As an example, the generated coordinates of the local coordinate module 408 can be used to implement user preferences such as height and level of detail of XR elements over distance. For example, the generated coordinates can be used to calculate or measure eye-to-eye vector measurements from an eye of the particular user representation to other user representations or XR elements in the corresponding personal artificial reality. The eye-to-eye distance and angle measurements may model the relative heights of different user representations. Accordingly, the length of the eye-to-eye distance measurements can vary according to how tall or short the particular user representation is relative to interactions with other user representations. For example, a relatively large length of eye-to-eye measurement that extends generally downwards in the Z-axis may indicate that the particular user representation is a tall person in their personal artificial reality.

The eye-to-eye vector measurements from the local coordinate module 408 can be used to scale user representations relative to each other in the personal artificial reality so that the dimensions of user representations and XR elements appear according to corresponding user preferences, for example. As an example, a tall user representation looking at a short user representation would result in the local coordinate module 408 scaling down the remainder of the shorter user representation's body based on the generated coordinates. For example, the local coordinate module 408 can scale the respective eyes or hands of two user representations that are talking or high fiving each other in their separate artificial realities based on their separate user preferences. Similarly, the shorter user representation looking up at the taller user representation would result in scaling up the remainder of the taller user representation's body. As such, the eye-to-eye measurements or eye tracking generally can be a basis for rendering the remainder of the personal artificial reality. The scale may be used to customize a level of detail in the personal artificial reality. For example, for a particular user of a XR compatible device that finds excess detail to be distracting or overwhelming, the local coordinate module 408 can reduce the detail for XR elements in the distance relative to the point of view of the particular user (e.g., scale relative to the particular user's user representation) or eliminate undesired animated visual effects from certain XR elements.

The global coordinate module 410 can be configured to implement a global or relational coordinate system in the remote platform(s) 404, such as for each XR compatible device of the remote platforms(s) 404. The local or personal coordinate system can be an "overlaid" coordinate system relative to the global or relational coordinate system. In particular, the global coordinate module 410 may maintain relative positions of user representations or XR elements in conjunction with the local coordinate module 408 causing the rest of the built personal artificial reality to be configured according to user preferences. The maintained relative positions can include positions of user representation features such as eyes, hands, feet, and/or the like. In this way, even as the local coordinate module 408 outputs coordinates for rendering the personal artificial reality such as from the perspective of a tall person, the global coordinate module 410 can output coordinates such that the configuration of the remaining XR elements remains the same. As an example, the global coordinate module 410 may maintain coordinates of important XR objects, user representations, and features of those objects and representations (e.g., coordinates of hands of user representations, etc.)

For example, the global coordinate module 410 can ensure that the personal versions of the shared artificial reality include the same relative dimension of user representations' hands (even while the height of user representations is adjusted and personalized) relative to themselves and relative to other user representations. The global coordinate module 410 can also ensure certain XR elements from the shared artificial reality environment remain in the same relative position across all personal artificial realities. That is, the relative location of a desk, non-playable character, tree, and/or the like can remain the same for all personal artificial realities due to the generally applicable global coordinates from the global coordinate module 410 even though local coordinates from the local coordinate module 408 can be different across different personal artificial realities.

The position module 412 can be configured to identify the location of various XR components of the shared artificial reality environment and/or personal versions of the artificial reality environment. The location of various XR components can be calculated relative to user representations, such as a particular user representation corresponding to a particular personal artificial reality. The position of the various XR components can be used for determining where a level of detail such as resolution of the various XR component is modulated. The location/position may be calculated based on coordinates from the local coordinate module 408 and/or the global coordinate module 410. For example, the position module 412 may rely on output from IMU units and/or position sensors of the XR compatible devices and/or the like. The position module 412 can output a head tilt measurement of the XR compatible devices. The head tilt measurement may be used by the position module 412 to determine an orientation of the particular user representation relative to the XR elements located in a virtual area of the shared artificial reality environment or personal artificial reality.

The perception module 414 may be configured to identify modifications to perceptions by the particular user representation and corresponding user based on user perception preferences, for example. The modifications to perceptions can be determined or inferred based on user perception preferences. For example, the user perception preferences can be input via corresponding XR compatible devices or associated user devices (e.g., mobile device, computer, tablet, HMD 200, XR control element, XR controllers, XR arm cuffs, etc.). The user input can be made to communicate the user perception preferences to specify desired XR settings for personal versions of the shared artificial reality environment, such as visual resolution, user representation appearance, and/or the like. The user input may be input via a user representation editor screen rendered on corresponding XR compatible devices and/or on XR displays in artificial reality. The user representation editor screen can be used to select discrete configurations of user representations or include types of perception settings for users to configure for their user representations.

The perception module 414 can be configured to modify visual and/or audio experiences for various user representations and corresponding users. The modified visual and/or audio experiences can be based on user perception preferences. Visual experience modulation can performed to ensure a calmer and less overwhelming experience, for example, such as to remove distracting or overstimulating visual stimuli. Similarly, audio experience modulation can be performed to ensure a quieter, less audibly overwhelming experience, such as to remove overstimulating audio stimuli. As an example, the perception module 414 can cause all voices in an XR area to sound flat instead of emotional (e.g., to avoid undesirable emotionally charged voices). As an example, the perception module 414 may reduce or remove sound effects and background music in the XR area. That is, the perception module 414 may cause the computing platform(s) 402 to quiet or silence audio effects (e.g., sound from XR elements, background music, etc.) that may cause sensory overload. Similarly, the perception module 414 may cause the computing platform(s) 402 to reduce or eliminate visual effects that can cause sensory overload, such as flashy animation effects.

As an example, resolution based adjustments can be made such as animated effects (e.g., sparkles, flashes, colors, etc.), special effects of other proximate user representations, lower resolution to make XR elements blurry, or eliminate visual effects altogether. In this way, the personal artificial reality for the particular user representation can be customized for the corresponding user to advantageously make the personal artificial reality more manageable for the user's social needs, health needs, and/or general preferences. Thus, undesirable visual noise can be filtered out of the user's point of view via the perception module 414. Additionally or alternatively, the relative position and orientation from the position module 412 may be used to implement visual attenuation of a level of detail (LOD) for the XR elements. For example, as the distance between certain XR elements and the particular user representation increases, the LOD can be decreased to lower geometry or texture details, which may enable more user representations and/or XR elements to be included in a particular XR space of the shared artificial reality environment.

Additionally or alternatively, the user perception preferences can be inferred based on user information, such as an indication on a user profile that a given user is shy. The inference can be output based on a machine learning algorithm, for example. The perception module 414 may infer or determine a change to a perception parameter based on the user perception preferences. An inferred change to the perception parameter may be suggested to corresponding users, such as via a prompt on the user representation editor screen (e.g., to select settings). For example, options to select settings of a personalized artificial reality can be sent to users of the shared artificial reality environment, such as via an XR world building component of the shared artificial reality environment. As an example, an XR game developer may determine or offer XR settings for the personalized artificial reality when the game is being executed. The inferred change may also be directly implemented to user representations or XR elements and may be approved or rejected by the corresponding users. For example, the perception module 414 may determine a change to the LOD, resolution, avatar preference, an artificial reality application, or vantage point (e.g., height or dimensions of the particular user representation) that is more in accordance with the user perception parameters.

As an example, the user perception parameters corresponding to the particular user representation may be indicative of a desire not to see or see reduced instances of disruptive special effects. Accordingly, the perception module 414 may cause the LOD or resolution of some or all special effects to be reduced or may even eliminate the occurrence of some or all special effects. For example, in the personalized artificial reality of the particular user representation, XR elements such as sparkles, colors, or animation may appear blurry or deactivated. For example, XR elements of the personalized artificial reality can be changed so that eye to eye contact between user representations is eliminated, such as due to social anxiety or other issues with certain users not wanting to experience looking at other users/user representations in the eye. For example, other user representations can be covered or changed in some ways, such as displaying other user representations with XR elements such as masks or sunglasses so that the corresponding user can feel more comfortable in their personalized artificial reality.

The change to the detail of such visual XR elements may also be implemented by the perception module 414 based on the hardware quality of the corresponding XR compatible devices (e.g., the HMD 200 or 250 does not have sufficient performance capability or is an older system that is not ideal for rendering the XR elements in full quality). As an example, the perception module 414 can cause an appearance of the particular user representation to change according to a determined or inferred avatar preference. As an example, the perception module 414 can change a simulated vantage point of the particular user representation in their particular artificial reality to correspond to how a user desires to view the XR world (e.g., as a tall person, short person, overhead bird, god, type of person, etc.). In this way, the perception module 414 can advantageously tailor and maintain multiple personalized artificial reality versions of the shared artificial reality environment according to each user or XR compatible device's corresponding needs, preferences, or specifications, without any disruption from one personalized XR version to another personalized XR version. For example, the needs can include social needs, social anxiety, and considerations for social comfort.

The avatar module 416 can be configured to operate in conjunction with the perception module 414 to implement the user representation editor screen as an avatar editor menu. The avatar module 416 can be configured to change how the particular user representation appears as a particular avatar and how the particular avatar perceives XR elements via the perception module 414. The appearance of the particular avatar can correspond to a user selected artificial reality application, such as an XR game that the particular user representation is engaged in. The trade dress of the XR game or application can be used to modify or configure the appearance of the particular user representation. For example, if the XR game is a first person shooting game, the particular avatar can appear as a soldier in military attire. The tailored appearance of the particular avatar based on the user selected artificial reality application can be automatically implemented, suggested, or affirmatively selected via corresponding user input into a XR compatible device. The tailored appearance can be specified based on a settings menu rendered on a display screen of the XR compatible device or as an XR screen in the personalized artificial reality, for example. As the particular avatar moves throughout the shared artificial reality, the avatar module 416 can apply style transfers for the particular avatar, such as based on the style of the XR area or selected artificial reality application being changed. As an example, as the particular avatar is transitioned into a selected XR game, the appearance of the particular avatar can be automatically changed as the transition occurs. As an example, the particular avatar may appear in a combination of styles/trade dresses based on multiple selected XR applications and/or XR areas that are selected or that the particular avatar is currently located at.

The artificial reality module 418 may be configured to control output of the shared artificial reality environment and personalized artificial reality environment. The artificial reality module 418 may indicate what artificial reality and/or XR elements are output to the corresponding XR compatible device of the particular user representation. The local coordinate system of the local coordinate module 408 and the global coordinate system of the global coordinate module 410 may be used by the artificial reality module 418 to determine geospatial details of user representations and/or XR elements in the shared and personalized artificial reality environments. Based on the local coordinate system and the global coordinate system, the artificial reality module 418 may maintain both a public shared artificial reality environment that all users have access to as well as private personalized versions of that shared artificial reality for each individual user of all users that desire a personalized artificial reality. This way, various instances of personalized artificial reality do not interfere with other instances of personalized artificial reality. As discussed herein, the perception preferences and/or parameters of the instances of personalized artificial reality can be determined, inferred, suggested, and/or directly input by corresponding users. The artificial reality module 418 can be configured to output warnings or notifications to users that the artificial reality they are experiencing is different from the real world. For example, the artificial reality module 418 can output an indication to a given user that they appear taller in their personalized artificial reality than their actual height in real life.

The training module 420 may be used to train the computing platform(s) 402 on user perception preferences and parameters as training data to identify settings of personalized artificial realities. The output of the training module 420 can enable the artificial reality module 418 to render personalized versions of the shared artificial reality environment. The settings identified by the training module 420 can include geospatial coordinates in XR space to set customized XR perception and user representation appearance settings, for example. The training module 420 may learn settings of the local coordinate system of the local coordinate module 408 and the global coordinate system of the global coordinate module 410, respectively, for modifying XR perception for the personalized versions of artificial reality. The learning by the training module 420 may be supervised, unsupervised, partially supervised, reinforced, and/or the like. As an example, the training module 420 can be used to classify training module 420 according to coordinate settings such as eye-to-eye vectors of user representations, resolution quality, LOD of certain coordinates in the local coordinate system and/or global coordinate system, and/or the like. In this way, if the given user prefers to appear as the tallest user representation in their personalized artificial reality, then the training module 420 can output coordinates of the local coordinate system corresponding to the given user representation being the tallest user representation in an XR area.

The inferencing module 422 can output inferences about coordinate system settings that correspond to instances of user perception preferences and parameters. For example, the inferencing module 422 can predict that preferences to look downwards at other user representations should be labeled with a high eye-to-eye distance or angle measurement in a downward direction along a y-axis (e.g., measured vertically downwards) as a coordinate system setting. The inferencing module 422 may be used in conjunction with the training module 420 to design a trained machine learning algorithm (e.g., prune, quantize, or otherwise configure the machine learning algorithm to reduce power consumption and latency) for making inferences about new data (e.g., new user perception preferences and parameters).

In some implementations, the computing platform(s) 402, the remote platform(s) 404, and/or the external resources 424 may be operatively linked via one or more electronic communication links. For example, such electronic communication links may be established, at least in part, via the network 310 such as the Internet and/or other networks. It will be appreciated that this is not intended to be limiting, and that the scope of this disclosure includes implementations in which the computing platform(s) 402, the remote platform(s) 404, and/or the external resources 424 may be operatively linked via some other communication media.

A given remote platform 404 may include client computing devices, such as artificial reality device 302, mobile device 304 tablet 312, personal computer 314, laptop 316, and desktop 318, which may each include one or more processors configured to execute computer program modules. The computer program modules may be configured to enable an expert or user associated with the given remote platform 404 to interface with the system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

The external resources 424 may include sources of information outside of the system 400, external entities participating with the system 300, and/or other resources. For example, the external resources 424 may include externally designed XR elements and/or XR applications designed by third parties. In some implementations, some or all of the functionality attributed herein to the external resources 424 may be provided by resources included in system 400.

The computing platform(s) 402 may include the electronic storage 426, a processor such as the processors 110, and/or other components. The computing platform(s) 402 may include communication lines, or ports to enable the exchange of information with a network and/or other computing platforms. Illustration of the computing platform(s) 402 in FIG. 4 is not intended to be limiting. The computing platform(s) 402 may include a plurality of hardware, software, and/or firmware components operating together to provide the functionality attributed herein to the computing platform(s) 402. For example, the computing platform(s) 402 may be implemented by a cloud of computing platforms operating together as the computing platform(s) 402.

The electronic storage 426 may comprise non-transitory storage media that electronically stores information. The electronic storage media of the electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). The electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 426 may include one or more virtual storage resources (e.g., cloud storage, a virtual private network, and/or other virtual storage resources). The electronic storage 426 may store software algorithms, information determined by the processor(s) 110, information received from computing platform(s) 402, information received from the remote platform(s) 404, and/or other information that enables the computing platform(s) 402 to function as described herein.

The processor(s) 110 may be configured to provide information processing capabilities in the computing platform(s) 402. As such, the processor(s) 110 may include one or more of a digital processor, an analog processor, a digital circuit designed to process information, an analog circuit designed to process information, a state machine, and/or other mechanisms for electronically processing information. Although the processor(s) 110 is shown in FIG. 1 as a single entity, this is for illustrative purposes only. In some implementations, the processor(s) 110 may include a plurality of processing units. These processing units may be physically located within the same device, or the processor(s) 110 may represent processing functionality of a plurality of devices operating in coordination. Processor(s) 110 may be configured to execute modules 408, 410, 412, 414, 416, 418, 420, 422 and/or other modules. Processor(s) 110 may be configured to execute modules 408, 410, 412, 414, 416, 418, 420, 422, and/or other modules by software; hardware; firmware; some combination of software, hardware, and/or firmware; and/or other mechanisms for configuring processing capabilities on the processor(s) 110. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 408, 410, 412, 414, 416, 418, 420, and/or 422 are illustrated in FIG. 4 as being implemented within a single processing unit, in implementations in which the processor(s) 110 includes multiple processing units, one or more of the modules 408, 410, 412, 414, 416, 418, 420, and/or 422 may be implemented remotely from the other modules. The description of the functionality provided by the different modules 408, 410, 412, 414, 416, 418, 420, and/or 422 described herein is for illustrative purposes, and is not intended to be limiting, as any of the modules 408, 410, 412, 414, 416, 418, 420, and/or 422 may provide more or less functionality than is described. For example, one or more of the modules 408, 410, 412, 414, 416, 418, 420, and/or 422 may be eliminated, and some or all of its functionality may be provided by other ones of the modules 408, 410, 412, 414, 416, 418, 420, and/or 422. As another example, the processor(s) 110 may be configured to execute one or more additional modules that may perform some or all of the functionality attributed below to one of the modules 408, 410, 412, 414, 416, 418, 420, and/or 422.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
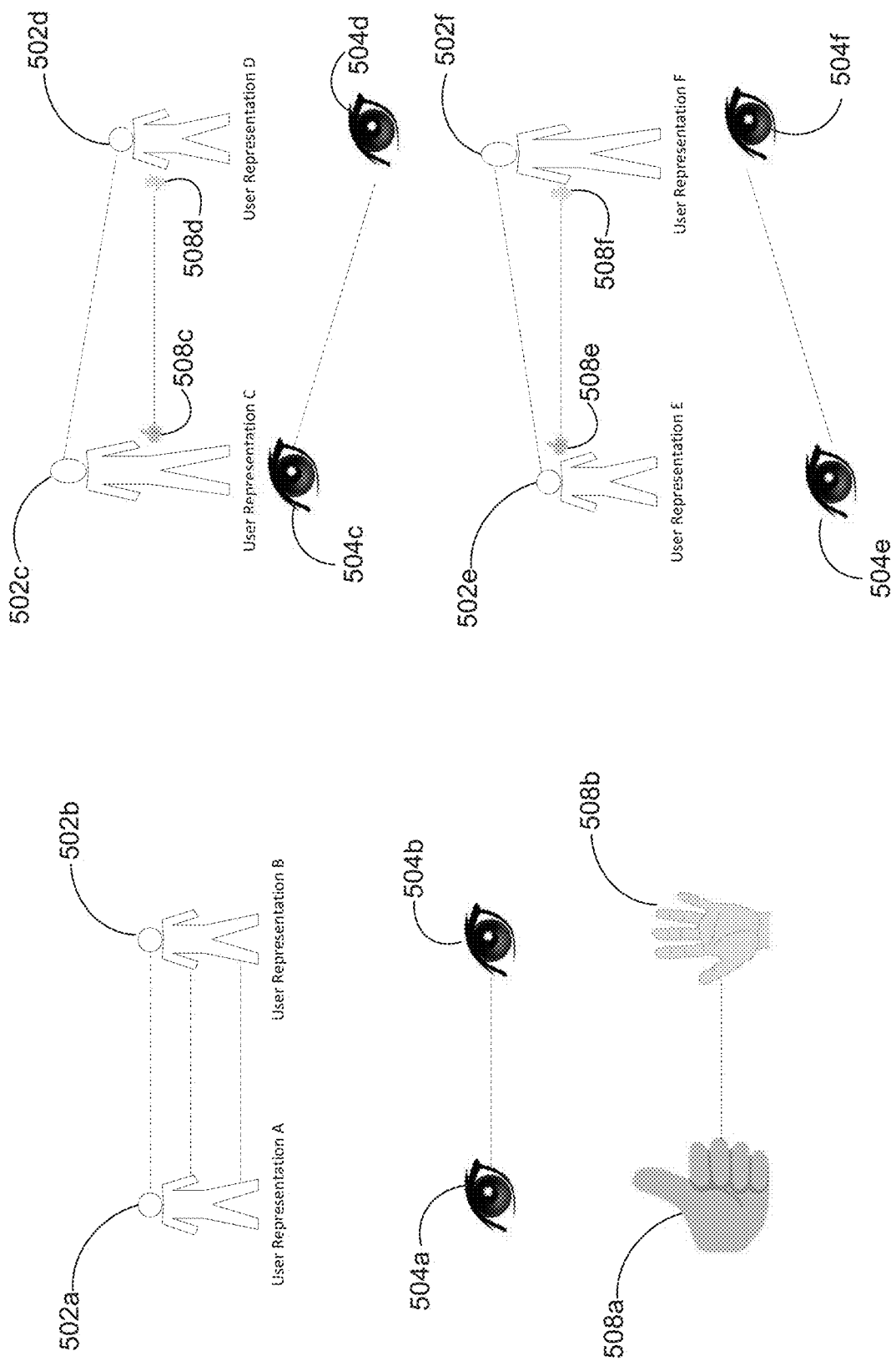
FIGS. 5A-5B illustrate example views of alternative perceived realities for a user representation in an artificial reality environment, according to certain aspects of the present disclosure.

FIGS. 5A-5B illustrate example views of alternative perceived realities for a user representation in an artificial reality environment, according to certain aspects of the present disclosure. The perceived realities for the user representation can be implemented as personalized versions of artificial reality corresponding to the shared artificial reality environment. User representations 502a-502f in the shared artificial reality environment are shown to perceive each other based on coordinate positions, such as via coordinates determined in one or more of a local, global, relational, and/or personal coordinate system. The perception of the user representations 502a-502f can depend on their corresponding height in the shared artificial reality environment and/or personalized artificial reality environments. As an example, the user representations 502a-502b can be the same height, the user representation 502c can be a taller height than the user representation 502d, and the user representation 502e can be a shorter height than the user representation 502f. These differences in height can be implemented by an XR computing server, which can be or include the computer system 400, the processors 110, and/or the like for rendering artificial reality and XR elements on XR compatible devices.

The XR computing server can configure these differences in height based on user perception preferences that are determined and inferred for each user of the shared artificial reality environment and/or personalized artificial reality environments. The perception of user representations can be changed based on the user perception preferences via coordinates of multiple coordinate systems. The multiple coordinate systems can include a relational or global coordinate system (e.g., via the global coordinate module 410) and a local or personal coordinate system (e.g., via the local coordinate module 408). The relational global coordinate system can track the relative positions of important XR features within the shared artificial reality environment, such as the relative positions of eyes and hands of user representations. The relative positions can have coordinates in the relational global coordinate system that reflect default geospatial positions, for example. As an example, the coordinates of the relational coordinate system can ensure that user representations appear as proportional XR representations of humans in artificial reality. The personal coordinate system may function as an overlay coordinate system on top of the relational coordinate system.

As such, the XR computing server can determine coordinates of the personal coordinate system for customizing the shared artificial reality environment according to user perception preferences or parameters. The XR computing server can determine personal coordinates for adjusting an interaction between a user's specific user representation and anther user's user representation. As an example, the XR computing server can scale the another user representation according to a desired height, width, or other vantage point of the specific user representation. The scaling can be determined based on adjusting the coordinates of eyes, hands, and/or other XR features relative to corresponding features of the another user representation so that the scaling simulates the particular user representation being tall, small, having a bird eye's view, and/or the like.

FIGS. 5A-5B depict how the desired height of the specific user representation can cause adjustments to the overlay personal coordinates system so that the corresponding user can experience their desired height in their personalized artificial reality. The desired height can represent a change from a default setting where two user representations 502a-502b are approximately the same height and have default feature proportions. That is, the user representations 502a-502b can see each other at the same relative eye level such as via eye-to-eye tracking of the eyes 504a-504b which reflect the same height of the user representations 502a-502b. The eyes 504a-504b can also illustrate that the two eyes of each of the user representations 502a-502b have proportional coordinates in the relational coordinate system, which can simulate a conventional distance between the human eyes of a real life human. Similarly, the hands 508a-508b can illustrate that the hands/digits have proportional coordinates in the relational coordinate system simulating a conventional set of distances between thumbs, fingers, hands, and/or the like of the real life human.

The overlay personal coordinates system can be configured by the XR computing server to adjust the coordinate of features of user representations so that they are still proportional (e.g., relative to the relational coordinates system) and also scaled to the heights of the involved user representations. For example, the user representation 502c may be taller than the user representation 502d. As such, the XR computing server can determine/change coordinates in the personal coordinate system and the relational coordinate system so that the eye contact and the general proportions/positions are maintained between the user representations 502c-502d while the user representation 502c looks downwards at the user representation 502d via the eyes 504c-504d to maintain eye contact. Similarly, if the user representation 502c is shorter than the user representation 502d, then the user representation 502c may look upwards at the user representation 502d via the eyes 504e-504f. Moreover, the hands 508c-508f can be configured in the personal coordinate system and the relational coordinate system so that the taller user representation has higher hands.

Thus, the user representation 502d would have to lift their arm/hand 508d relative to the arm/hand 508c to match the same height of the user representation 502c to account for their different heights. Similarly, the user representation 502f would have to lower their arm/hands 508f to match the same height of the user representation 502e to account for their different heights. In this way, the remainder of the simulated body of any of the user representations 502a-502f can be scaled up or down based on the corresponding vantage point (e.g., height of observing user). Thus, user representations 502a-502e can interact with each other, such as high five each other with the correct customized dimensions specified by individual personalized artificial realities. The personal coordinate system and the relational coordinate system may advantageously enable this scaling and customizing of user representation and XR element perception without excessive warping or re-rendering.

Users may also express perception preferences that reduce or eliminate eye contact, such as due to a desire to reduce social anxiety or increase the comfort of a social interaction and/or the like. For example, the eyes 504a-504f of user representations 502a-502f can be distorted or otherwise obscured during social interactions for users that do not desire eye contact. As an example, users may select an option to deactivate eye contact via their XR compatible device or the XR computing server can infer the user preference to deactivate eye contact such as based on adjusting the viewing direction of eyes 504a-504f, adding a mask to cover eyes 504a-504f, adding sunglasses to obscure eyes 504a-504f, showing a blank face to avoid showing eyes 504a-504f, and/or the like. The deactivated eye contact option can be implemented asynchronously such that user representation 502a could maintain eye contact in their corresponding artificial reality while the user representation 502b could avoid eye contact in their corresponding artificial reality in an interaction with each other.

Figure 6:
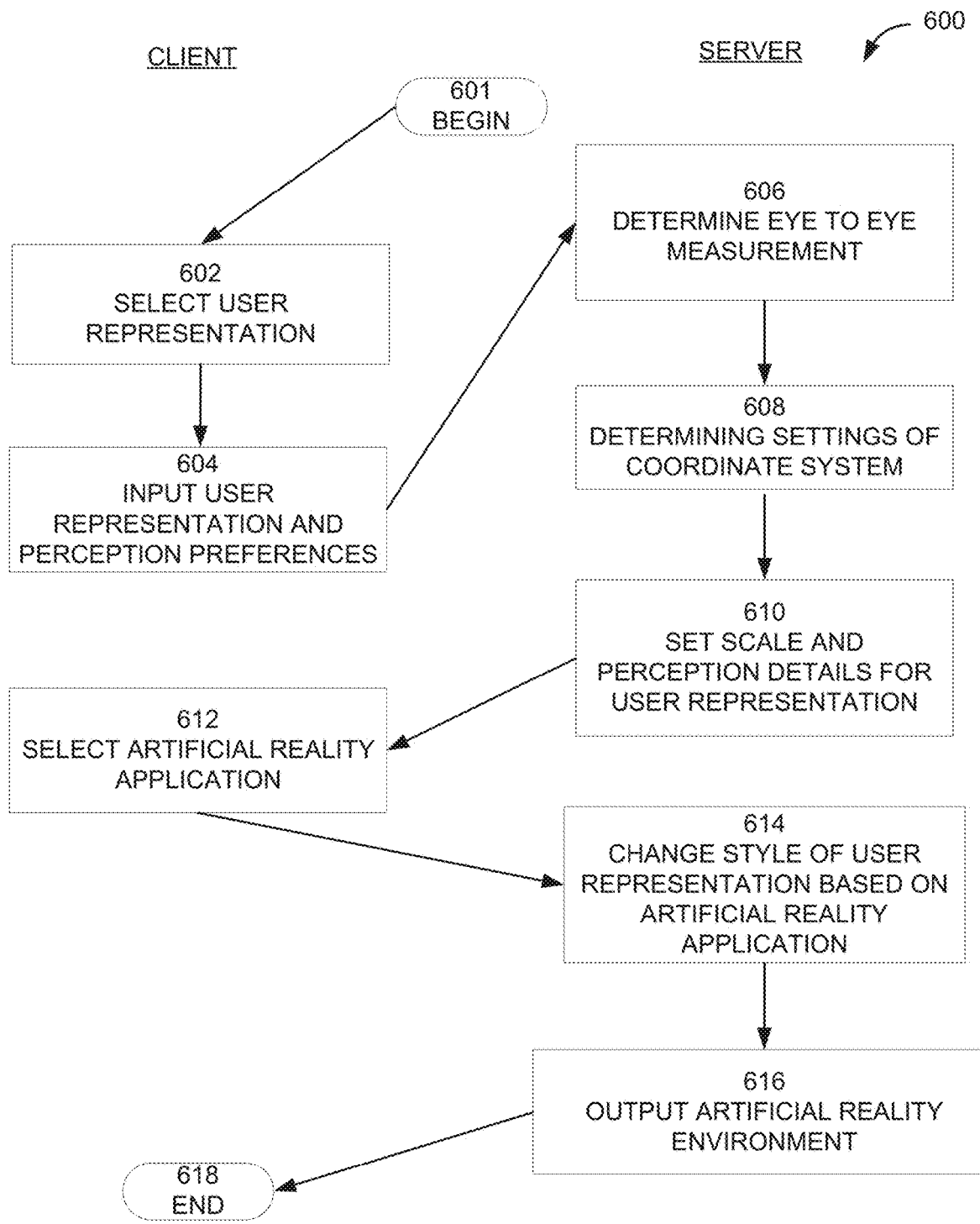
FIG. 6 is an example flow diagram for output of a personalized artificial reality environment via a client and server of an artificial reality platform, according to certain aspects of the present disclosure.

FIG. 6 is an example flow diagram (e.g., the process 600) for output of a personalized artificial reality environment via a client and server of an artificial reality platform (e.g., XR platform), according to certain aspects of the present disclosure. The personalized artificial reality environment may be a customized version of a shared artificial reality environment rendered by an XR platform. For explanatory purposes, the example process 600 is described herein with reference to a client and a server. The client and server may be components of a content platform of a computing platform. Further for explanatory purposes, the blocks of the example process 600 are described herein as occurring in serial, or linearly. However, multiple instances of the example process 600 may occur in parallel, overlapping in time, almost simultaneously, or in a different order from the order illustrated in method 600. In addition, the blocks of the example process 600 need not be performed in the order shown and/or one or more of the blocks of the example process 600 need not be performed. For purposes of explanation of the subject technology, the process 600 will be discussed in reference to one or more figures above (e.g., the computing system 400, client computing devices, and server computing devices 306a-306b, etc.).

The process 600 may begin at step 601. At step 602, a user of a client such as an XR compatible device of remote platform(s) 404 of FIG. 4 may select a user representation for the personalized artificial reality environment and/or shared artificial reality environment. At step 604, the client may be used by the user to input the selected user representation and user perception preferences. The client may also be used to change user perception preferences and perception settings of their personalized artificial reality environment. At step 606, a server such as a XR computing server of the computing platform(s) of FIG. 4 may determine an eye-to-eye measurement for the selected user representation. As an example, the determined eye-to-eye measurement can be used to determine how high or low the height of the selected user representation should be relative to interactions with other user representations. This way, a conversation between the selected user representation and another user representation in an XR area can be scaled so that the dimensions of the selected user representation and another user representation are adjusted based on the determined eye-to-eye measurement in accordance with how tall or short the user perception preferences indicate.

In some situations, the height of the selected user representation can be specified by an XR application developer, such as if the selected user representation is involved in a selected artificial reality application (e.g, XR game) that specifies characteristics of users of the selected artificial reality application. For example, the selected user representation may be a dwarf character in the XR game such that the XR application developer would specify that the selected user representation must appear/be short if they are a dwarf. As an example, the user perception preferences can be indicative of an XR application or game development setting, such as a perception preference associated with each character or player type of the XR game. For example, the perception preferences associated with being a priest character compared to a magician character can be different and specified by the XR application developer of an XR fantasy game. For example, the magician character can perceive the XR atmosphere of the XR fantasy game in a different color, resolution, LOD, and/or the like in their personalized artificial reality compared to other players of the same XR fantasy game/shared artificial reality environment.

At step 608, the XR computing server can determine settings of one or more coordinate systems. For example, the coordinate systems can include a personal coordinate system and a relational coordinate system. Coordinates of the relational coordinate system can track geospatial information (e.g., object and relative positions of important XR features). Coordinates of the personal coordinate system can reflect modified perception preferences such as a custom height or dimensions of the selected user representation, a resolution detail of XR elements seen by the selected user representation, a visual animation effect of the XR elements, and/or the like. That is, the personal coordinate system can be built around user perception preferences relating to the relational coordinate system. The determined settings can include various determined coordinates of the coordinate systems. For example, the settings can be determined based on a machine learning algorithm. User perception preferences input at step 604 can be input into the machine learning algorithm.

At step 610, the XR computing server can set scale and perception details for the user representation. For example, the scale can be determined based on the coordinate system settings and/or the eye-to-eye measurement. The scale can function as a scale factor based on the height. If the selected user representation is relatively taller than another user representation, then the scale factor can cause the remaining part of the body of the another user representation (e.g., below the eyes of the selected user representation during a conversation or interaction) to scale down. If the selected user representation is relatively shorter than the another user representation, than the scale factor can cause the remaining part of the body of the selected user representation (e.g., to the eyes of the another user representation during a conversation or interaction) to scale up. The scaling up or scaling down can be performed based on the eye-to-eye measurement so that scaling is performed while maintaining the relative positions of XR features in the relational coordinate system. The eye-to-eye measurement could be calculated first followed by calculation of the scale of user representation bodies. The eye-to-eye measurement can be determined based on an IMU of an XR compatible device such as the HMD 200. The XR computing server may also set perception details for XR elements in order to be less distracting, more comfortable and/or the like for the user.

For example, special visual effects can be turned off or reduced to eliminate distraction or anxiety from excessive visual stimulus. As an example, the special visual effects of XR elements including surrounding user representations in proximity to the selected user representation can be deactivated or reduced. As an example, the resolution or LOD of XR elements visible to the selected user representation can be lowered so that certain XR elements desirably appear blurry to the user. Furthermore, the resolution or LOD can be attenuated or reduced such that user representations that are closer to the selected user representation appear more clearly than other user representations that are further away from the selected user representation in an XR area of the shared artificial reality environment.

At step 612, the client may be used by the user to select an artificial reality application or other XR element. At step 614, the XR computing server can change a style of the user representation based on the selected artificial reality application. For example, the style of the selected user representation according to an appearance, feeling, style, trade dress, and/or the like is associated with the selected artificial reality application. As an example, the selected user representation can be restyled according to a first person shooter XR game, such that the selected user representation appears in camouflage military attire. As an example, the selected user representation can be restyled according to multiple XR applications selectable in the shared artificial reality environment such that the selected user representation appears dressed in a combination or hybrid of styles of multiple XR games or applications.

For example, the selected user representation can be attired in their personal artificial reality according to a cartoon animation with a clothing style of a movie. For example, the selected user representation can be styled according to a television show character and also appear in an XR space of an unrelated artificial reality application according to the television show character. As an example, as the selected user representation selects to enter into an artificial reality or XR application, the visual style or appearance of the selected user representation can be changed (e.g., automatically) according to the characteristics (e.g., visual characteristics) of the artificial reality or XR application being entered. The user may generally select settings to configure the appearance of their selected user representation according to the styles of one or more known characters in media (e.g., film media, print media, non-fiction media, etc.) as one style or a combination or hybrid of multiple styles.

At step 616, the XR computing server can output the selected artificial reality application via the personalized artificial reality environment and/or shared artificial reality environment. The XR computing server can maintain and output corresponding personalized versions of the shared artificial reality environment for each user including each user's selected artificial reality application and personalized XR perception settings, without dependence on other personalized versions. In this way, the XR computing server may host parallel personalized artificial realities for users of the shared artificial reality environment. At step 618, the example process 600 may end.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 7:
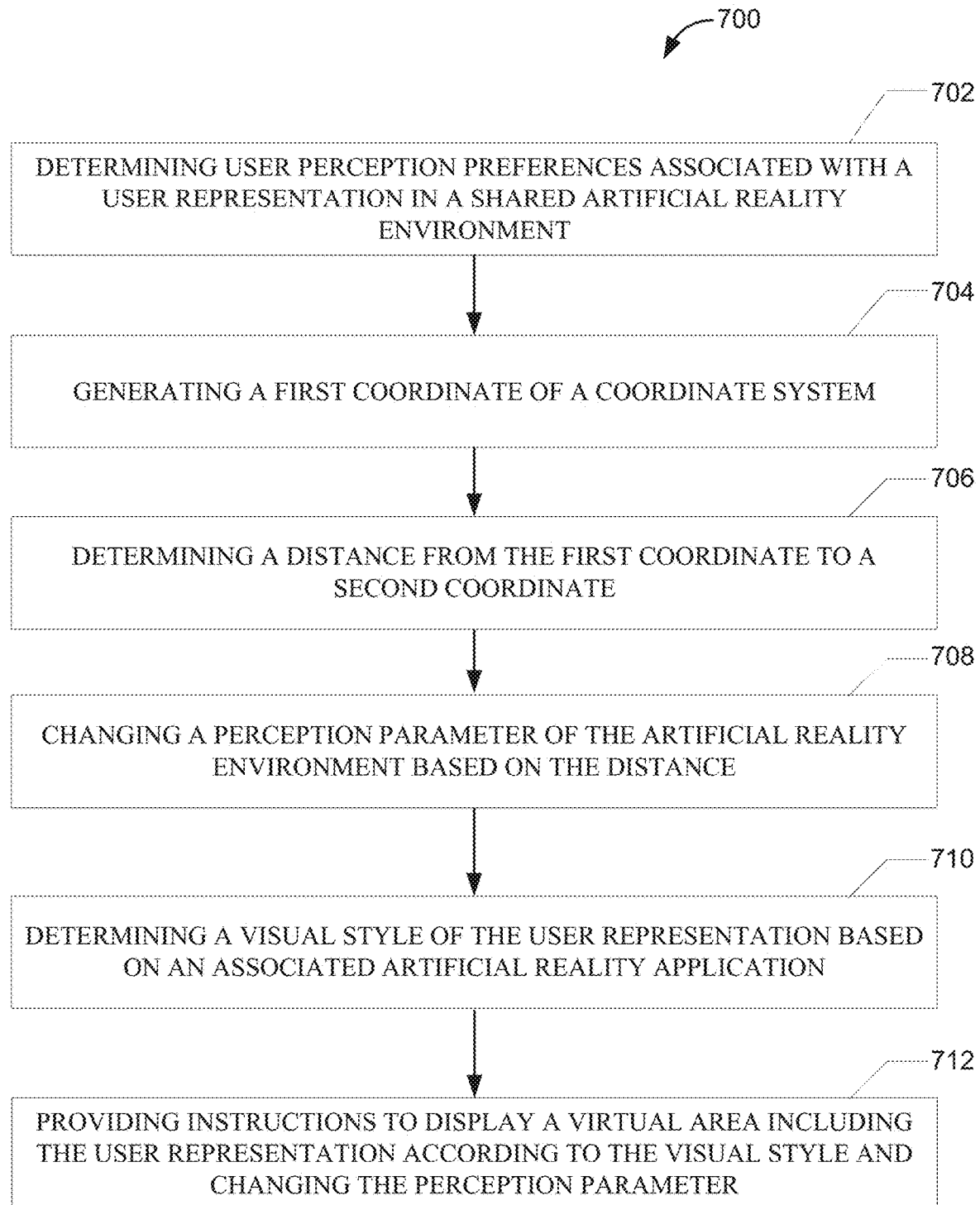
FIG. 7 is an example flow diagram for changing perception of artificial reality content in a shared artificial reality environment, according to certain aspects of the present disclosure.

FIG. 7 illustrates an example flow diagram (e.g., process 700) for changing perception of artificial reality content in a shared artificial reality environment, according to certain aspects of the disclosure. For explanatory purposes, the example process 700 is described herein with reference to one or more of the figures above. Further for explanatory purposes, the steps of the example process 700 are described herein as occurring in serial, or linearly. However, multiple instances of the example process 700 may occur in parallel. For purposes of explanation of the subject technology, the process 700 will be discussed in reference to one or more of the figures above.

At step 702, user perception preferences associated with a user representation (e.g., user representation 502*a*) in the shared artificial reality environment can be determined. According to an aspect, the process 700 may further include receiving a user input indicative of the user perception preferences. For example, the user input from a user device (e.g., XR compatible user device, HMD 200, etc.) may be used to indicate the user perception preferences. According to an aspect, determining the user perception preferences can comprise determining, according to the user perception preferences, at least one of: a height of the user representation, a perception resolution, an avatar preference, or an artificial reality application reference. At step 704, a first coordinate of a coordinate system may be generated. For example, the first coordinate corresponds to a location of the user representation in the shared artificial reality environment. According to an aspect, generating the first coordinate can comprise determining the first coordinate based on a global coordinate system (e.g., implemented by global coordinate module 410) or a local coordinate system (e.g., implemented by global coordinate module 408) for the shared artificial reality environment.

At step 706, a distance or angle from the first coordinate to a second coordinate of the coordinate system may be determined. For example, the second coordinate corresponds to an artificial reality element in the shared artificial reality environment. According to an aspect, determining the distance from the first coordinate to the second coordinate can comprise: determining a distance from a first eye (e.g., eye 504*c*) of the user representation to a second eye (e.g., 504*d*) of another user representation; determining a scale factor based on the distance from the first eye to the second eye; and determining a distance from the first eye to a location in the virtual area corresponding to an animation or a visual effect. According to an aspect, determining the distance from the first coordinate to the second coordinate can comprise determining a height of the user representation or another user representation. According to an aspect, the process 700 may further comprise applying a machine learning algorithm to determine settings of the coordinate system based on the user perception preferences.

According to an aspect, the process 700 may further comprise determining, via a machine learning algorithm, the coordinate system for the user representation based on the user perception preferences. According to an aspect, the process 700 may further comprise determining the coordinate system as an overlay for a user version of the shared artificial reality environment. At step 708, a perception parameter of the artificial reality element can be changed based on the determined distance. According to an aspect, changing the perception parameter of the artificial reality element can comprise changing a level of resolution detail in the virtual area. As an example, the level of resolution detail is associated with visual effects or texture details of the artificial reality element.

At step 710, a visual style of the user representation may be determined based on an associated artificial reality application. According to an aspect, determining the visual style of the user representation can comprise configuring the visual style according to determining attire or an appearance of an avatar character corresponding to the associated artificial reality application. According to an aspect, determining the visual style of the user representation can comprise determining a hybrid visual style corresponding to a combination of the associated artificial reality application and another associated artificial reality application. At step 712, instructions to display a virtual area including the user representation in the shared artificial reality environment according to the visual style of the user representation and based on changing the perception parameter may be provided. According to an aspect, providing instructions to display the virtual area may comprise displaying the virtual area based on a user identity associated with the user representation.

Figure 8:
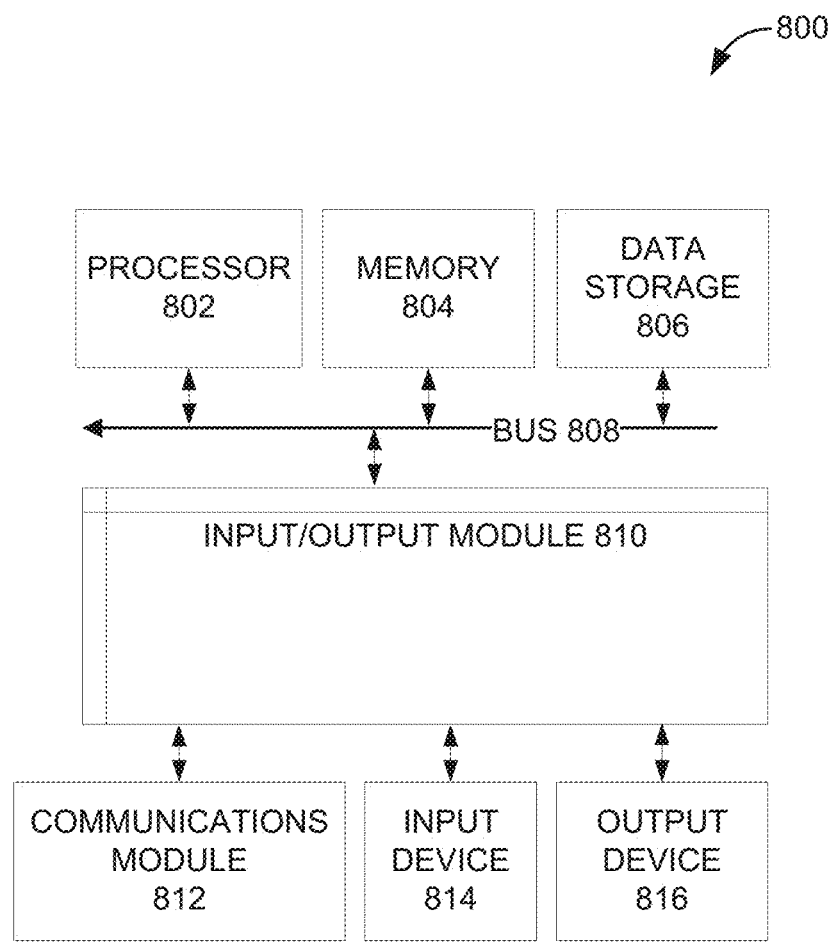
FIG. 8 is a block diagram illustrating an example computer system which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

The computer system 800 (e.g., server and/or client) includes a bus 808 or other communication mechanism for communicating information, and a processor 802 coupled with the bus 808 for processing information. By way of example, the computer system 800 may be implemented with one or more processors 802. Each of the one or more processors 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by the processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 800 further includes a data storage device 806 such as a magnetic disk or optical disk, coupled to bus 808 for storing information and instructions. The computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as an LCD (liquid crystal display) monitor, for displaying information to the user.

According to one aspect of the present disclosure, the above-described systems can be implemented using a computer system 800 in response to the processor 802 executing one or more sequences of one or more instructions contained in the memory 804. Such instructions may be read into memory 804 from another machine-readable medium, such as data storage device 806. Execution of the sequences of instructions contained in the main memory 804 causes the processor 802 to perform the process steps described herein. One or more processors in a multi-processing arrangement may also be employed to execute the sequences of instructions contained in the memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 800 can include clients and servers. A client and server are generally remote from each other and typically interact through a communication network. The relationship of client and server arises by virtue of computer programs running on the respective computers and having a client-server relationship to each other. The computer system 800 can be, for example, and without limitation, a desktop computer, laptop computer, or tablet computer. The computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 802 for execution. Such a medium may take many forms, including, but not limited to, non-volatile media, volatile media, and transmission media. Non-volatile media include, for example, optical or magnetic disks, such as the data storage device 806. Volatile media include dynamic memory, such as the memory 804. Transmission media include coaxial cables, copper wire, and fiber optics, including the wires that comprise the bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads XR data and provides an artificial reality, information may be read from the XR data and stored in a memory device, such as the memory 804. Additionally, data from the memory 804 servers accessed via a network, the bus 808, or the data storage 806 may be read and loaded into the memory 804. Although data is described as being found in the memory 804, it will be understood that data does not have to be stored in the memory 804 and may be stored in other memory accessible to the processor 802 or distributed among several media, such as the data storage 806.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for changing perception of artificial reality content in a shared artificial reality environment, the method comprising:
    determining user perception preferences associated with a user representation in the shared artificial reality environment;
    generating a first coordinate of a coordinate system, wherein the first coordinate corresponds to a location of the user representation in the shared artificial reality environment;
    determining a distance or angle from the first coordinate to a second coordinate of the coordinate system, wherein the second coordinate corresponds to an artificial reality element in the shared artificial reality environment;
    changing a perception parameter of the artificial reality element based on the distance;
    determining a visual style of the user representation based on an associated artificial reality application; and
    providing instructions to display a virtual area including the user representation in the shared artificial reality environment according to the visual style of the user representation and based on changing the perception parameter.

2. The computer-implemented method of claim 1, wherein determining the user perception preferences comprises determining, according to the user perception preferences, at least one of: a height of the user representation, a perception resolution, an avatar preference, or an artificial reality application reference.

3. The computer-implemented method of claim 1, wherein generating the first coordinate comprises determining the first coordinate based on a global coordinate system or a local coordinate system for the shared artificial reality environment.

4. The computer-implemented method of claim 1, wherein determining the distance from the first coordinate to the second coordinate comprises:
    determining a distance from a first eye of the user representation to a second eye of another user representation;
    determining a scale factor based on the distance from the first eye to the second eye; and
    determining a distance from the first eye to a location in the virtual area corresponding to an animation or a visual effect.

5. The computer-implemented method of claim 1, wherein determining the distance from the first coordinate to the second coordinate comprises determining a height of the user representation or another user representation.

6. The computer-implemented method of claim 1, wherein changing the perception parameter of the artificial reality element comprises changing a level of resolution detail in the virtual area, wherein the level of resolution detail is associated with visual effects or texture details of the artificial reality element.

7. The computer-implemented method of claim 1, wherein determining the visual style of the user representation comprises configuring the visual style according to determining attire or an appearance of an avatar character corresponding to the associated artificial reality application.

8. The computer-implemented method of claim 1, wherein determining the visual style of the user representation comprises determining a hybrid visual style corresponding to a combination of the associated artificial reality application and another associated artificial reality application.

9. The computer-implemented method of claim 1, wherein providing instructions to display the virtual area comprises displaying the virtual area based on a user identity associated with the user representation.

10. The computer-implemented method of claim 1, further comprising:
    receiving a user input indicative of the user perception preferences;
    determining, via a machine learning algorithm, the coordinate system for the user representation based on the user perception preferences;
    applying the machine learning algorithm to determine settings of the coordinate system based on the user perception preferences; and
    determining the coordinate system as an overlay for a user version of the shared artificial reality environment.

11. A system for changing perception of artificial reality content in a shared artificial reality environment, comprising:
    one or more processors; and
    a memory comprising instructions stored thereon, which when executed by the one or more processors, causes the one or more processors to perform:
        determining user perception preferences associated with a user representation in the shared artificial reality environment;
        applying a machine learning algorithm to determine settings of a coordinate system based on the user perception preferences;
        generating a first coordinate of the coordinate system, wherein the first coordinate corresponds to a location of the user representation in the shared artificial reality environment;
        determining a distance or angle from the first coordinate to a second coordinate of the coordinate system, wherein the second coordinate corresponds to an artificial reality element in the shared artificial reality environment;

changing a perception parameter of the artificial reality element based on the distance;
determining a visual style of the user representation based on an associated artificial reality application; and
providing instructions to display a virtual area including the user representation in the shared artificial reality environment according to the visual style of the user representation and based on changing the perception parameter.

12. The system of claim 11, wherein the instructions that cause the one or more processors to perform determining the user perception preferences cause the one or more processors to perform determining, according to the user perception preferences, at least one of: a height of the user representation, a perception resolution, an avatar preference, or an artificial reality application reference.

13. The system of claim 11, wherein the instructions that cause the one or more processors to perform generating the first coordinate cause the one or more processors to perform determining the first coordinate based on a global coordinate system or a local coordinate system for the shared artificial reality environment.

14. The system of claim 11, wherein the instructions that cause the one or more processors to perform determining the distance from the first coordinate to the second coordinate cause the one or more processors to perform:
determining a distance from a first eye of the user representation to a second eye of another user representation;
determining a scale factor based on the distance from the first eye to the second eye; and
determining a distance from the first eye to a location in the virtual area corresponding to an animation or a visual effect.

15. The system of claim 11, wherein the instructions that cause the one or more processors to perform determining the distance from the first coordinate to the second coordinate cause the one or more processors to perform determining a height of the user representation or another user representation.

16. The system of claim 11, wherein the instructions that cause the one or more processors to perform changing the perception parameter of the artificial reality element cause the one or more processors to perform changing a level of resolution detail in the virtual area, wherein the level of resolution detail is associated with visual effects or texture details of the artificial reality element.

17. The system of claim 11, wherein the instructions that cause the one or more processors to perform determining the visual style of the user representation cause the one or more processors to perform configuring the visual style according to determining attire or an appearance of an avatar character corresponding to the associated artificial reality application.

18. The system of claim 11, wherein the instructions that cause the one or more processors to perform providing instructions to display a virtual area cause the one or more processors to perform displaying the virtual area based on a user identity associated with the user representation.

19. The system of claim 11, further comprising stored sequences of instructions, which when executed by the one or more processors, cause the one or more processors to perform:
receiving a user input indicative of the user perception preferences;
determining, via a machine learning algorithm, the coordinate system for the user representation based on the user perception preferences; and
determining the coordinate system as an overlay for a user version of the shared artificial reality environment.

20. A non-transitory computer-readable storage medium comprising instructions stored thereon, which when executed by one or more processors, cause the one or more processors to perform operations for changing perception of artificial reality content in a shared artificial reality environment, comprising:
receiving a user input indicative of user perception preferences;
determining the user perception preferences associated with a user representation in the shared artificial reality environment;
applying a machine learning algorithm to determine settings of a coordinate system based on the user perception preferences;
determining the coordinate system as an overlay for a user version of the shared artificial reality environment;
generating a first coordinate of the coordinate system, wherein the first coordinate corresponds to a location of the user representation in the shared artificial reality environment;
determining a distance or angle from the first coordinate to a second coordinate of the coordinate system, wherein the second coordinate corresponds to an artificial reality element in the shared artificial reality environment;
changing a perception parameter of the artificial reality element based on the distance;
determining a visual style of the user representation based on an associated artificial reality application; and
providing instructions to display a virtual area including the user representation in the shared artificial reality environment according to the visual style of the user representation and based on changing the perception parameter.

* * * * *